UNITED STATES PATENT OFFICE.

KARL GOLDSCHMIDT AND JOSEF WEBER, OF ESSEN-ON-THE-RUHR, GERMANY, ASSIGNORS, BY MESNE ASSIGNMENTS, TO GOLDSCHMIDT DETINNING COMPANY, OF JERSEY CITY, NEW JERSEY, A CORPORATION OF NEW JERSEY.

METHOD OF CLEANING OLD TINNED SHEET-IRON BOXES AND OTHER TINNED ARTICLES TO RENDER THE SAME SUITABLE FOR BEING DETINNED.

13,123. Specification of Reissued Letters Patent. Reissued June 28, 1910.

No Drawing. Original No. 836,028, dated November 13, 1906, Serial No. 292,662. Application for reissue filed April 8, 1908. Serial No. 425,973.

*To all whom it may concern:*

Be it known that we, KARL GOLDSCHMIDT and JOSEF WEBER, subjects of the King of Prussia, German Emperor, and residents of Essen-on-the-Ruhr, German Empire, have jointly invented a new and useful method of cleaning old tinned sheet-iron boxes and other tinned articles to render the same suitable for being detinned—that is to say, freed from tin—of which the following is an exact specification.

While the scrap of tinned sheet-iron which results as waste material in the manufacture of all kinds of tin-plate articles has for a long time been technically utilized by being resolved into their components, tin and iron, this has been quite different with the various kinds of articles made from tin-plate, especially old preserved-food tins, which so far have seldom been touched by the detinning industry. For more than fifty years numerous patents relating to the detinning of tin-plate scrap have been taken out, showing the lively interest taken in the problem of the utilization of tinned waste materials. These numerous patents, however, nearly exclusively dealt with the problem of separating the tin from the iron or otherwise rendering these waste materials suitable for industrial utilization.

But few patents deal with the question of preparing old tin-plate articles for the purpose of rendering same suitable for industrial utilization. Of late patents have been applied for for machinery for cutting up or perforating tin-plate boxes. The most important question, however, of the cleaning of these tinned materials—using the word "cleaning" in its widest meaning—has only in exceptional cases formed the subject of patents or of descriptions in the technical literature. With reference to this we refer to the English Patent Brindley, No. 8,693, of April 15, 1902, wherein apparatus are described for melting off the solder and for removing from the tinned metal oil, grease, paint, &c., which we call "filth".

For the process of freeing metals from tin or "detinning", everything that is not tin or iron must be considered as impurity. Thus it is not sufficient to free the old tinned materials from only lacquer, paper labels, remainders of food, coloring-matter, and whatever else may still adhere to them from the former contents, or in the form of ornamental or advertising matter, but also the solder, of which much is used in the manufacture of these articles, especially tin boxes, must be removed, as it contains considerable amounts of lead besides tin. This lead is naturally an impurity, since in the various detinning methods in use it combines either with the tin or the tin salts, seriously affecting, of course, the quality of these latter, or else it remains behind in the iron.

A great hindrance to detinning, especially in the case of old tin boxes, is a thin caoutchouc ring, which in folding the edges of the tins is placed in the fold to make the same tight. All cleaning methods which do not destroy this caoutchouc ring suffer from the drawback that the fold which holds the caoutchouc ring is not attacked by the tin dissolving agent. Thus a part of the tin is not recovered, and this part represents not only a loss of tin, but it also makes the iron less valuable on account of its containing tin. The amount of tin thus lost to the operator is by no means small, considering that of the old tin-plate articles principally in question a very large portion consists of old preserved-food tins of medium and small size—such as old sardine-tins, tins for various delicacies, preserves, vegetables, meat, and so on—and that of these small tin boxes the folded edge constitutes a comparatively large percentage. Extensive experiments have shown that tins completely freed from varnish, lacquer, paper, remainders of food, and also from the solder, but which still had the strip of caoutchouc in the folds, gave after being detinned an iron containing from 0.5 to one per cent. of tin, a quality that is nearly unsalable, because it is useless for the main use of old iron—viz., for melting down in the Martin furnace.

It has been shown by extensive trials that to render old tinned sheet-iron boxes really serviceable for detinning purposes the cleaning process must be divided in two parts:

First. Removal of the adhering organic substances, not including the above-mentioned caoutchouc strips. Trials have shown that the removal of these organic substances is effected rapidly and with as much completeness as is required for the purpose in view by a treatment of the old tins with caustic alkali. A dilute solution containing, say, three per cent. sodium hydroxid will do for the purpose if the solution is heated. One may of course also work with stronger solutions—say with ten per cent., sodium hydroxid—which may be cold. For reason of economy it will of course generally be preferred to use heated and more diluted solutions. The length of the time required for this treatment with alkaline solution depends on the greatly-varying nature of the impurities from which the old tins and the like are to be freed. Five minutes will often be sufficient. Sometimes fifteen minutes may be required. It has been found that such a washing sufficiently destroys the organic substances and that very well-cleaned tin boxes are obtained, which after having been cleaned from the adhering solution by another washing only require to be freed from the solder and the aforementioned caoutchouc strips. These latter being embedded in the air-tight folds are of course not at all or little affected by the alkaline treatment. By boiling the old tins with soda instead of caustic alkali the effect achieved is by no means equivalent. The treatment with soda requires much longer time and much stronger solutions, and even then the purpose aimed at is frequently not achieved.

Second. Removal of solder and caoutchouc. If subsequent to the above-described treatment with caustic alkali the tinned materials be heated to a temperature only slightly above the melting-point of solder—for example to about 350° Celsius—the solder will be gained; but at this low temperature it will only flow off reluctantly and show a strong tendency of further alloying with the tin. Besides at this temperature the caoutchouc strips in the folds will not be destroyed. To attain this purpose, the tinned materials must be exposed to a temperature decidedly higher than the melting-point of the solder. This presents the advantage not only of the solder being obtained in a much more thinly-liquid state, thus preventing a part of it alloying with the tin on the sheet-iron surface and forming tin-lead alloys, which it is difficult to dissociate and which on their part again must be considered as a great hindrance to the detinning, but also of resulting in the complete destruction of the caoutchouc strips. The boxes may be heated for a certain length of time to the comparatively low temperature of 400° to 500° Celsius; but a still more efficient means has been found to be the sudden exposure of the tin boxes to a temperature of from 600° to 800° Celsius. In this way the solder is melted off in five to seven minutes, and at the same time the caoutchouc is destroyed. Of course the duration of the heating and the degree of temperature vary according to the size of the tin boxes treated and may also depend on the thickness of the folded edges or on the quality of the caoutchouc to be destroyed, and the above-stated figures are only meant to give an approximate idea and not to represent the utmost limits to which one may have to go. Excessive heating must, however, be avoided, because it would cause the tin to alloy with the iron, from which alloy it would not be possible to extract the tin with the methods hitherto known and employed. If, however, the heating is done with some care, the method described will yield an excellent material, suitable in every respect for detinning by the electrolytic as well as by a chlorin process. The material shows clean and smooth surfaces. There is only a very small amount formerly occupied by lead adhering, and there are no more inaccessible spots on the material. At the place of the caoutchouc strip there is now a narrow channel, allowing the detinning substance to circulate.

The following is a description of the course of the operation: The old tins are placed in a perforated receptacle which is provided with a lid similar to that of a wash-cylinder and then dipped into a vat with heated solution. During the dipping the receptacle containing the tinned materials is stirred, shaken about, or given a revolüble movement, so that the materials are thoroughly washed through with the lye and all organic remainders get their share of the treatment. After thus having removed all organic substances in this manner the cylinder, with the tinned articles, is placed in a basin or reservoir filled with water wherein the materials are washed or rinsed. The cylinder with the tinned articles is then placed in a hearth-furnace, which may be arranged in such manner as to have the fire at the side of the hearth-pit, so that the cylinder suspended over the pit will be hit by the passing fire-gases from the side. In this way a rapid heating of the materials in the perforated receptacle takes place. The solder flows down and is collected on the hearth. The fire-gases of course escape on the other side of the hearth. In this way the contents of the cylinder can rapidly be brought to the desired temperature. Subsequently the cylinder, with its contents, is lifted out of the hearth and the contents poured out. This material is then ready for being detinned, either by the electrolytic process or by chlorin or by any other process.

As mentioned by Meredith Leitch in his American Patent No. 800,223, an important item in the process of preparing old tins for being freed from tin is the recovery of the solder.

The methods of Brindley and Leitch, which do not specify the washing of the tinned articles previous to their being freed from solder, suffer from the great drawback that the dried remainders of organic substances, sand and rust, and other impurities drop into the solder, spoiling the same to such an extent as to considerably reduce its value.

By dividing the operation of cleaning the tins into two parts—viz., washing of the tinned articles in an alkaline solution and subsequent heating—the special advantage is insured that the solder (adhering to the tin) is recovered in a state of comparatively high purity—that is to say, free from the remainders of all kinds of impurities adhering to the tins.

Having thus fully described the nature of our invention, what we desire to secure by Letters Patent of the United States is:—

1. The method of cleaning sheet-iron objects such as old tin boxes and the like preparatory to detinning, which consists in first saponifying the adhering filth and afterward exposing the objects to a high temperature.

2. The method of cleaning sheet-iron objects such as old tin boxes and the like preparatory to detinning which consists in first saponifying the adhering filth by means of an alkaline solution and afterward exposing the objects to a high temperature.

3. The method of cleaning sheet-iron objects such as old tin boxes and the like preparatory to detinning, which consists in first treating them with a solution of sodium hydroxid and afterward exposing them to a high temperature.

4. The method of cleaning sheet-iron objects such as old tin boxes and the like preparatory to detinning which consists in first treating them with a solution of sodium hydroxid while in a heated state and afterward exposing them to a high temperature.

5. The method of cleaning sheet-iron objects such as old tin boxes and the like preparatory to detinning, which consists in first treating them with a cleansing solution and afterward exposing them for a certain time to a temperature of not less than 400° and not more than 800° Celsius, according to the nature of the substances to be deteriorated.

6. The method of cleaning sheet-iron objects such as old tin boxes and the like preparatory to detinning, which consists in first treating them with an alkaline solution and afterward exposing them for a certain time to a temperature of not less than 400° and not more than 800° Celsius, according to the nature of the substances to be deteriorated.

7. The method of cleaning sheet-iron objects such as old tin boxes and the like, preparatory to detinning, which consists in first treating them with a solution of sodium hydroxid and afterward exposing them for a certain time to a temperature of not less than 400° and not more than 800° Celsius according to the nature of the substances to be deteriorated.

8. The method of cleaning sheet-iron objects such as old tin boxes and the like, preparatory to detinning, which consists in first treating them with a solution of sodium hydroxid while in a heated state and afterward exposing them for a certain time to a temperature of not less than 400° and not more than 800° Celsius, according to the nature of the substances to be deteriorated.

9. The method of cleaning sheet-iron objects such as old tin boxes and the like preparatory to detinning, which consists in first saponifying the adhering filth in a movable object-container, and afterward exposing the container with its saponified objects to a high temperature.

In witness whereof we have hereunto set our hands in the presence of two witnesses.

KARL GOLDSCHMIDT.
JOSEF WEBER.

Witnesses:
L. MAX WOHLGEMUTH,
E. ALDENDORFF.